(12) United States Patent
Philtron et al.

(10) Patent No.: US 10,697,825 B2
(45) Date of Patent: Jun. 30, 2020

(54) OMNIDIRECTIONAL OPTICAL FIBER BRAGG GRATINGS FOR ULTRASONIC GUIDED WAVE SENSING AND ASSOCIATE SOURCE LOCATION METHODS

(71) Applicant: FBS, Inc., Bellefonte, PA (US)

(72) Inventors: Jason Philtron, State College, PA (US); Cody J. Borigo, Port Matilda, PA (US); Steven E. Owens, Bellefonte, PA (US); Joseph L. Rose, State College, PA (US)

(73) Assignee: FBS, INC., Bellefonte, PA (US)

( * ) Notice: Subject to any disclaimer, the term of this patent is extended or adjusted under 35 U.S.C. 154(b) by 208 days.

(21) Appl. No.: 16/033,911

(22) Filed: Jul. 12, 2018

(65) Prior Publication Data

US 2019/0017864 A1    Jan. 17, 2019

Related U.S. Application Data

(60) Provisional application No. 62/531,663, filed on Jul. 12, 2017.

(51) Int. Cl.
*G01H 9/00* (2006.01)
*G02B 6/02* (2006.01)
*G01D 5/353* (2006.01)

(52) U.S. Cl.
CPC ......... *G01H 9/004* (2013.01); *G01D 5/35312* (2013.01); *G01D 5/35316* (2013.01); *G02B 6/02076* (2013.01); *G02B 6/02209* (2013.01)

(58) Field of Classification Search
CPC ............... G01D 5/353; G01D 5/35312; G01D 5/35316; G01H 9/00; G01H 9/004; G02B 6/02076; G02B 6/02209

USPC .................................................... 73/655, 657
See application file for complete search history.

(56) References Cited

U.S. PATENT DOCUMENTS

| | | |
|---|---|---|
| 5,397,891 A | 3/1995 | Udd et al. |
| 5,410,404 A | 4/1995 | Kersey et al. |
| 7,038,190 B2 | 5/2006 | Udd et al. |
| 7,719,689 B2 | 5/2010 | Lee et al. |

(Continued)

OTHER PUBLICATIONS

Rose, J.L., Ultrasonic Guided Waves in Solid Media, Cambridge University Press, (2014): pp. 1-15, 269-275.

(Continued)

*Primary Examiner* — Benjamin R Schmitt
(74) *Attorney, Agent, or Firm* — Duane Morris LLP

(57) ABSTRACT

A system includes at least one optical fiber having at least one FBG and a detection system. The optical fiber is configured to be coupled to a structure in at least one location. The location at which the optical fiber is to be coupled to the structure is different from a location at which the FBG is disposed. The detection system includes a light source configured to inject light into the optical fiber, a photodetector configured to detect a shift in a wavelength spectrum of light reflected by the FBG as a result of a time-varying strain induced at the at least one FBG, and a processor configured to detect a shear-horizontal guided stress wave propagating in said structure based on the shift in the wavelength spectrum detected by the photodetector induced by a longitudinal-type guided stress wave that is propagated along the optical fiber.

21 Claims, 21 Drawing Sheets

(56) References Cited

U.S. PATENT DOCUMENTS

2003/0127587 A1* 7/2003 Udd .................. G01D 5/35383
250/227.14

OTHER PUBLICATIONS

Perez, I. et al., "Acoustic Emission Detection Using Fiber Bragg Gratings", Ft. Belvoir Defense Technical Information Center, Jan. 2001, 8 pages.

Wee J. et al., "Simulating increased Lamb wave detection sensitivity of surface bonded fiber Bragg grating," Smart Materials and Structures, 2017, 26:045034 1-11.

Wee, J. et al., "Increasing signal amplitude in fiber Bragg grating detection of Lamb waves using remote bonding," Applied Optics, Jul. 2016, 55(21):5564-5569.

Zhang, Q. et al., "Acoustic emission sensor system using a chirped fiber-Bragg-grating Fabry-Perot interferometer and smart feedback control," Optics Letters, Feb. 2017, 42(3):631-634.

Giurgiutiu, V., et al., "Omnidirectional piezo-optical ring sensor for enhanced guided wave structural health monitoring," Smart Materials and Structures, 2015, 24:015008 1-13.

* cited by examiner

US 10,697,825 B2

OMNIDIRECTIONAL OPTICAL FIBER BRAGG GRATINGS FOR ULTRASONIC GUIDED WAVE SENSING AND ASSOCIATE SOURCE LOCATION METHODS

CROSS-REFERENCE TO RELATED APPLICATIONS

This application claims priority to U.S. Provisional Patent Application No. 62/531,663, filed Jul. 12, 2017, the entirety of which is herein incorporated by reference.

FIELD OF DISCLOSURE

The disclosed systems and methods relate to structural health monitoring and non-destructive examination. More specifically, the disclosed systems and methods relate to structural heath monitoring and non-destructive examination of plates and plate-like structures, rods, beams and bars, rail, storage tanks and pressure vessels, tubes and pipes, bridges, and other structures.

BACKGROUND

Research into the use of optical sensors for ultrasonic wave and acoustic emission sensing is becoming more popular. Most commonly, these sensors are fiber Bragg gratings (FBGs) that are bonded directly to a test surface. Ultrasonic waves that pass through the structure cause local expansion and compression in the fiber grating, causing a change in effective wavelength of the grating. This change in wavelength changes the grating's reflected light spectrum. Reception of ultrasonic waves using FBGs takes advantage of the ultrasonic amplitude modulation of the reflected light spectrum, which can be extracted (e.g., by using a matched grating) to provide a signal functionally equivalent to the voltage-time signal extracted from traditional sensor types (e.g., piezoelectric, magnetostrictive, etc.). The FBG sensors may be single-wavelength, π-shifted, variable wavelength (e.g. chirp), or of another design. Furthermore, the FBG sensors can be implemented in single-sensor configurations or in more complex configurations, including, but not limited to, Fabry-Perot interferometers. Advantages of FBG sensors include: use of multiple sensors (gratings of different wavelengths) along a single fiber, wide frequency bandwidth, insensitivity to EMI, minimal signal loss with long cables, reduced cable and sensor weight, and others.

SUMMARY

In some embodiments, a system includes at least one optical fiber having at least one FBG and an optical guided wave detection system. The at least one optical fiber is configured to be coupled to a structure in at least one location. The location at which the optical fiber is configured to be coupled to the structure being different from a location at which the FBG is disposed. The optical guided wave detection system includes a light source, a photodetector, and a processor in signal communication with the photodetector. The light source is configured to inject light into the at least one optical fiber. The photodetector is configured to detect a shift in a wavelength spectrum of light reflected by the at least one FBG as a result of a time-varying strain induced at the at least one FBG. The processor is configured to detect a shear-horizontal guided stress wave propagating in said structure based on the shift in the wavelength spectrum detected by the photodetector induced by a longitudinal-type guided stress wave that is propagated along the at least one optical fiber.

In some embodiments, a system includes at least one optical fiber having at least one first fiber Bragg grating (FBG) disposed along its length and a detection system coupled to the at least one optical fiber. The at least one optical fiber is configured to be coupled to a structure in at least two different locations such that the at least one first FBG is disposed between the at least two different locations. The detection system includes a light source, a photodetector, and a processor. The light source is optically coupled to the at least one optical fiber and configured to inject light into the at least one fiber. The photodetector is configured to detect a shift in a wavelength spectrum of light reflected by the at least one first FBG as a result of a time-varying strain induced at the at least one first FBG. The processor is in signal communication with the photodetector and is configured to detect a guided stress wave in the structure based on the shift in the wavelength spectrum detected by the photodetector.

In some embodiments, a method includes introducing light into at least one optical fiber; extracting at least one time-varying signal by detecting a shift in a wavelength spectrum of light reflected by at least one fiber Bragg grating (FBG) sensor as a result of a time-varying strain on the at least one FBG sensor; and detecting a guided stress wave propagating in the structure based on the shift in the wavelength spectrum. The at least one optical fiber is coupled to a surface of a structure in at least two different locations, and the at least one FBG sensor is disposed along a length of the at least one optical fiber between the at least one optical fiber is coupled to the surface of the structure.

DETAILED DESCRIPTION

Figure 1A:
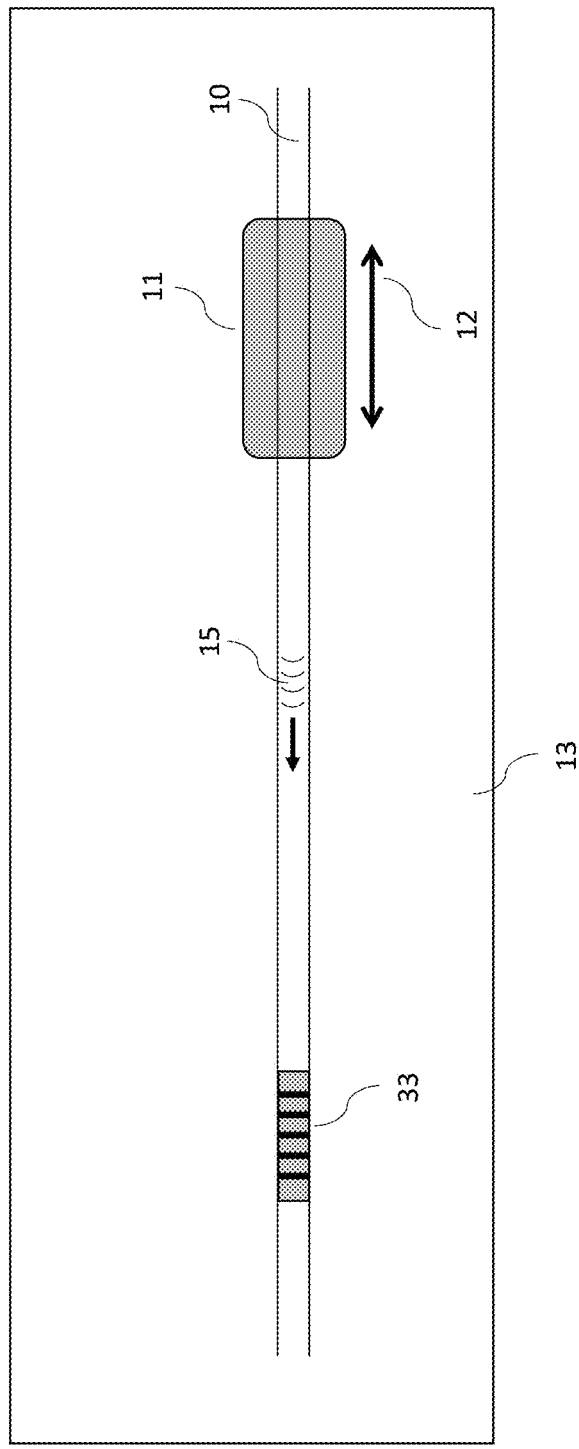
FIG. 1A illustrates a the process by which a remotely-bonded fiber connected to an FBG is capable of detecting incident SH guided wave modes by means of an L(0,1) guided wave mode in the optical fiber.

This description of the exemplary embodiments is intended to be read in connection with the accompanying drawings, which are to be considered part of the entire written description.

Recently, some researchers have described a method to bond remotely an FBG with the purpose of increasing the signal amplitude of received $S_0$-mode Lamb-type guided wave modes. In a remote bonding case, the ultrasonic wave in the structure travels into the fiber in the bonded section, then travels as a guided elastic stress wave in the fiber until it reaches the grating and affects the effective grating wavelength by compressing and extending the grating as the ultrasonic wave travels through the fiber. The increased amplitude of remotely-bonded FBGs provides an advantage over directly-bonded FBGs, but like directly-bonded FBGs, the method is still limited by its directionality characteristics. Until now, no one has yet described the reception of shear horizontal (SH) type guided wave modes using a remote bonding technique, nor the ability to receive ultrasonic waves omnidirectionally using an FBG sensor.

The use of FBG sensors disclosed herein is not limited to plate-like structures, but also can be applied to pipe, rail, and any other surface, interface, or waveguide. It should also be noted that the SH-type mode in plates is analogous to the torsional mode in pipe, and the methods described here can be used to receive torsional guided waves (and other modes) in pipes and other structures. SH-type guided wave modes have several advantages over Lamb-type modes including insensitivity to water loading, and nondispersive wave characteristics for the fundamental mode such that the wave velocity does not change with frequency or structure thickness.

In some embodiments, a system for non-destructive inspection of a structure includes at one optical fiber containing at least one first fiber Bragg grating (FBG), a light source optically coupled to said fiber, and a photodetector system configured to detect a shift in the reflected wavelength spectrum of said light from said FBG. The system further contains a first section of said optical fiber that is non-collocated with said first FBG and is coupled to a structure-under-test in a first location, and which is used to detect shear horizontal (SH-type) guided stress waves propagating in said structure by means of a longitudinal-type guided stress wave that is propagated along the fiber, said longitudinal-type wave being generated by the coupling of the SH-wave-induced surface vibration at the first remotely-coupled section on the fiber and proportional to the component of said surface vibration parallel to the fiber at the first remotely-coupled section. The longitudinal-type wave induces a time-varying strain in the first FBG, such that the system is capable of detecting SH-type guided waves propagating in the structure-under-test and impinging upon the first location within a limited range of angles relative to the orientation of the fiber in the first remotely-coupled section. Furthermore, a method for non-destructive inspection of a structure includes using at least one FBG sensor configured in accordance with the disclosed system and further comprising at least two remotely-coupled sections of a fiber oriented orthogonally and in close proximity to one another on a structure, extracting at least two time-varying signal components from said system, determining the relative amplitude and phase of the signal components, and processing this information to determine at least one of a bidirectional wave path of an SH-type guided stress wave and a bidirectional wave path of a non-SH-type guided stress wave propagating in the structure.

Particle displacement for the shear horizontal (SH) type guided wave mode is different from that for Lamb-type guided wave modes. For the SH mode, the vibration is pure shear—in the direction perpendicular to the wave propagation direction—and in-plane. In-plane motion enables efficient transfer of stress wave energy into an optical fiber bonded to a plate. As illustrated in FIG. 1A, if the particle surface displacement 12 induced by a propagating SH-type guided wave mode in the structure under test 13, is parallel to a section 11 of an optical fiber 10 that is bonded to structure 13, then the wave energy is efficiently transferred into the L(0,1) elastic guided wave mode 15 that propagates in said fiber; the L(0,1) mode is similar to a compressional wave mode. This is convenient because the L(0,1) mode is the fastest guided wave mode in the fiber and is generally non-dispersive over the frequency range of interest for the vast majority of applications. The ultrasonic L(0,1) guided wave 15 in the fiber 10 travels toward the fiber Bragg grating (FBG) 33, where it causes local compression and expansion, changing the dominant wavelength in the reflected light spectrum from the optical sensor and allowing for optical detection of the SH guided wave mode in structure 13.

Figure 1B:
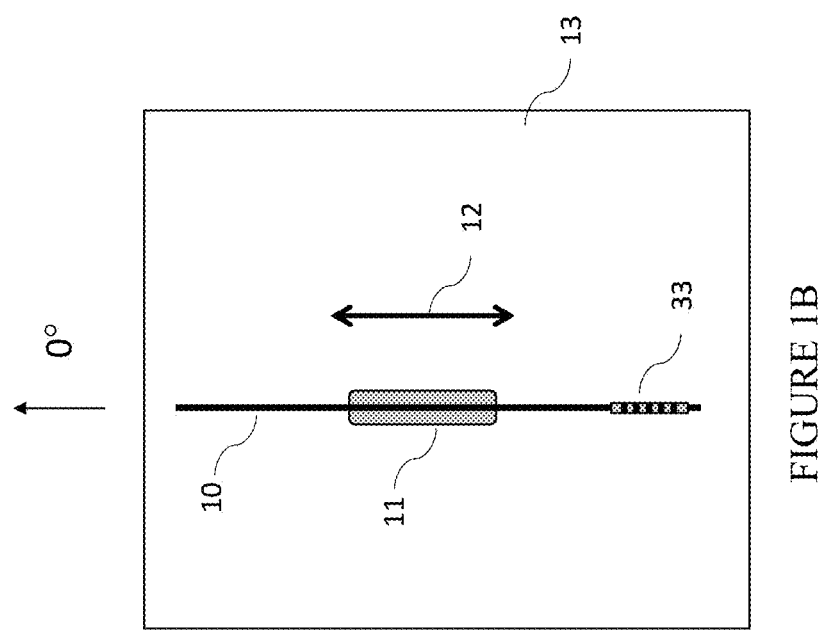
FIG. 1B illustrates a remotely-bonded fiber connected to an FBG with an incident wave inducing surface vibration parallel to the fiber direction.
Figure 1C:
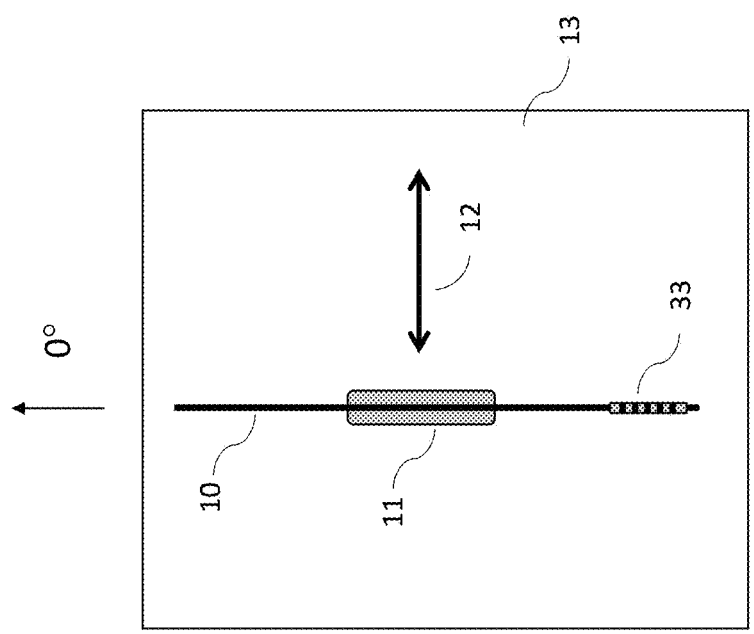
FIG. 1C illustrates a remotely-bonded fiber connected to an FBG with an incident wave inducing surface vibration perpendicular to the fiber direction.

The angular response of this type of ultrasonic wave transfer into the fiber is dependent on the incident wave angle; this concept is illustrated in FIG. 1B and FIG. 1C. In the case of FIG. 1B, when the surface displacement 12 induced by the incident guided wave is aligned with the section 11 of the fiber 10 that is remote from the FBG 33 and is bonded to the structure under test 13, a maximum amount of energy is transferred. In the case of FIG. 1C, when the displacement 12 is perpendicular to the fiber 10, a minimum amount of energy is transferred. The wave propagation direction associated with these displacements is different for Lamb-type and SH-type guided wave modes. For Lamb-type modes, the wave propagation direction is in the same direction as the displacement, such that the wave propagation direction is aligned with the bonded section of the fiber in FIG. 1B, and perpendicular to it in FIG. 1C. For SH-type modes, the wave propagation direction is orthogonal to the displacement, such that the wave propagation direction is perpendicular to the bonded section of the fiber in FIG. 1B and aligned with it in FIG. 1C.

Note that the description uses the term "bonded" or "coupled" interchangeably. However, these terms are used to describe an arrangement in which the fiber 10 is attached to the test surface so that ultrasonic wave motion is transferred into the fiber. The fiber need not be bonded (or coupled) permanently to the structure 13, but may be attached with any adhesive, including adhesive tape, or any other ultrasonic couplant that supports in the transfer of the test structure's displacement into the fiber.

Figure 2:
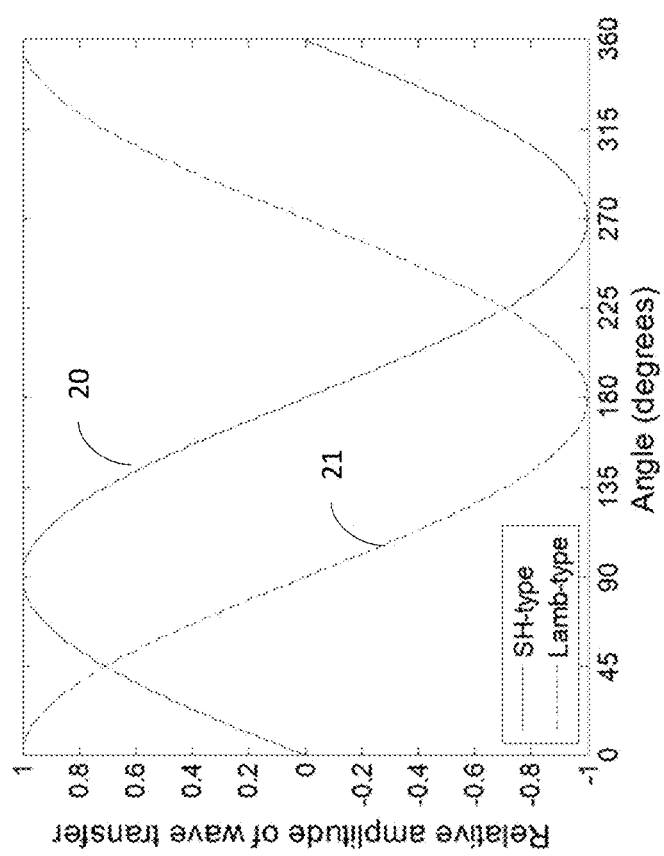
FIG. 2 illustrates the relationship between relative signal amplitude detected by a remotely-bonded FBG sensor, the type of incident ultrasonic guided wave (SH or Lamb), and the incident angle relative to the fiber.

The angular dependence of wave reception can be described by a sine or cosine function (depending on the wave type and coordinate system); this is illustrated in FIG. 2. The case of an incident SH-type guided wave mode is represented by the solid line 20 in FIG. 2. At 0° incidence of an SH wave mode, minimal wave energy is transferred into the fiber. At 90° SH wave mode incidence, the maximum wave energy is transferred, because the surface displacement 12 aligns with the bonded section 11 of the fiber 10. At 180° SH wave mode incidence, the displacement 12 again is perpendicular to the fiber 10, and transferred wave energy is minimized. At 270° SH wave mode incidence, the displacement 12 also aligns with the fiber 10, but now the motion causes the first motion in the fiber in the opposite direction (compression vs. extension), as represented by a negative sign on the y-axis. For the case of Lamb-type guided wave incidence on a bonded section 11 of a fiber 10, the relationship between orientation and transferred wave energy is 90° out-of-phase from that of the SH-type waves, as illustrated by the dashed line 21 in FIG. 2.

The benefits of a remotely-bonded FBG sensor, in which the bonded section 11 of the fiber 10 does not contain the fiber Bragg grating, for the detection of ultrasonic guided waves include the ability to efficiently detect shear horizontal (SH) guided waves and the increased signal amplitude compared to conventional direct-bonded FBG sensors. However, a remotely-bonded FBG sensor is still directional in its sensitivity, meaning it is receptive to SH waves incident perpendicular to the bonded fiber section, but almost completely insensitive to SH waves incident parallel to the bonded fiber section. The opposite directionality is true to Lamb waves with in-plane surface displacement. In many guided wave sensing applications, it is advantageous to have omnidirectional, or at least multi-directional, sensitivity to incident waves. Research has shown that direct-bonded FBG sensors can detect SH guided waves, but the angular dependence is described by $\sin(2\theta)$. This means that every 90° there is a minimum sensitivity in reception of guided waves, as opposed to every 180° for direct-bonded FBG sensors detecting Lamb waves and remote-bonded FBG sensors detecting SH or Lamb guided waves. This more limited sensitivity pattern, which contains twice as many minimum sensitivity angles, presents additional challenges in the creation of an omnidirectional sensor and associated signal processing techniques. Further discussion is provided in G. Liu et al., "Detection of Fundamental Shear Horizontal Guided Waves Using a Surface-Bonded Chirped Fiber Bragg-Grating Fabry-Perot Interferometer." J. Lightwave Tech. 36(11), 2286-2294 (2018), the entirety of which is incorporated by reference herein.

Figure 3:
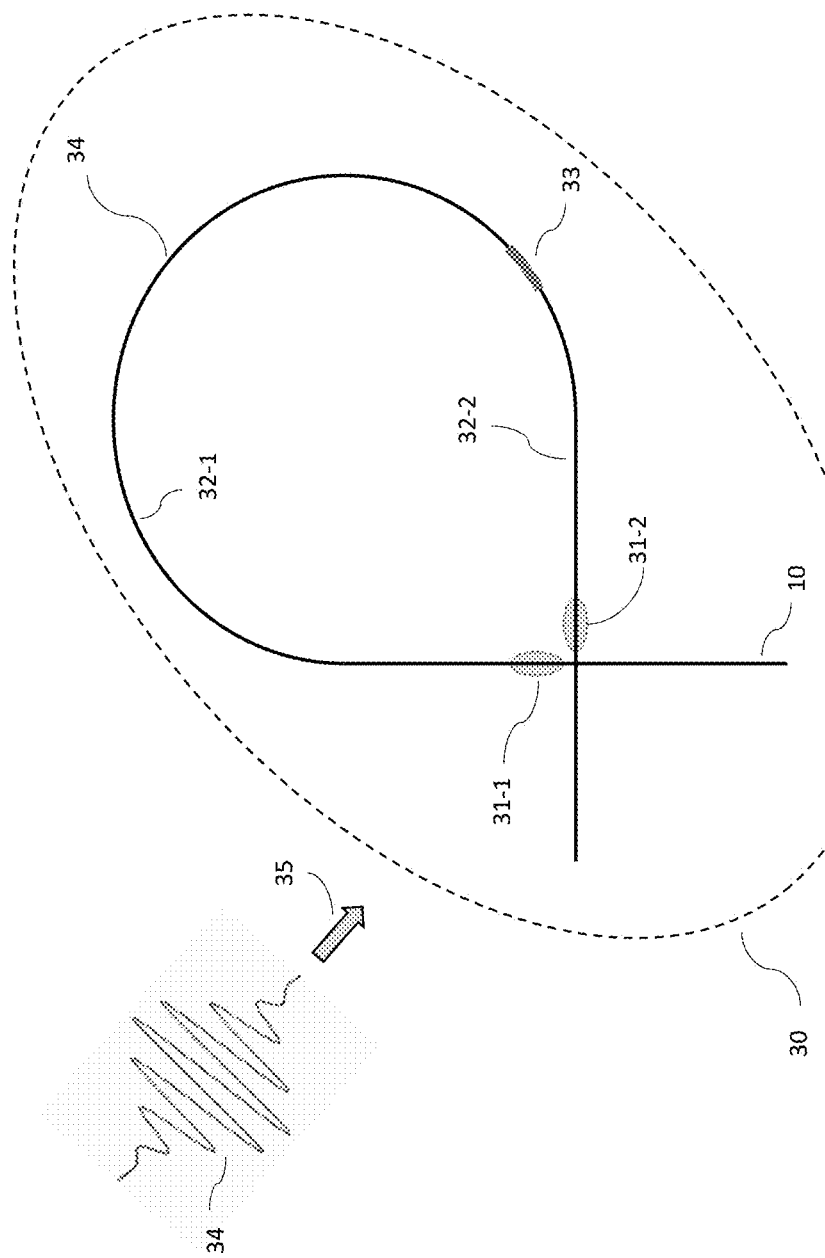
FIG. 3 illustrates one embodiment of a dual remotely-bonded FBG sensor for omnidirectional guided wave sensing.

In order to achieve omnidirectional wave sensitivity, a novel, remotely-bonded FBG sensor configuration 30 has been developed, one embodiment of which is illustrated in FIG. 3. In this embodiment, two sections or points 31-1 and 31-2 of a fiber optic cable 10 are bonded to a structure under test 13 approximately orthogonally to and in close proximity to one another (e.g., with a separation distance on the surface of the structure that is less than one quarter of the wavelength of the guided wave that is to be detected by the sensor), with the FBG 33 configured between the two bonded points 31-1 and 31-2 but offset from the midpoint between them such that there exist two non-equal lengths of fiber 32-1 and 32-2 between FBG 33 and the two bonded points 31-1 and 31-2, respectively, thus forming a loop 34 in fiber 10. A sensor having such a configuration is capable of receiving both SH- and Lamb-type waves 34, regardless of the incident wave direction 35. Said incident wave 34 will be detected by both bonded sections 31-1 and 31-2, with an offset in arrival time consistent with the difference in fiber lengths 32-1 and 32-2 between each bonded section and the FBG 33. For example, in some embodiments, the offset in arrival time will be equal to the difference in fiber lengths 32-1 and 32-2 divided by the velocity of the longitudinal-type wave that is propagated in the fiber.

Figure 4:
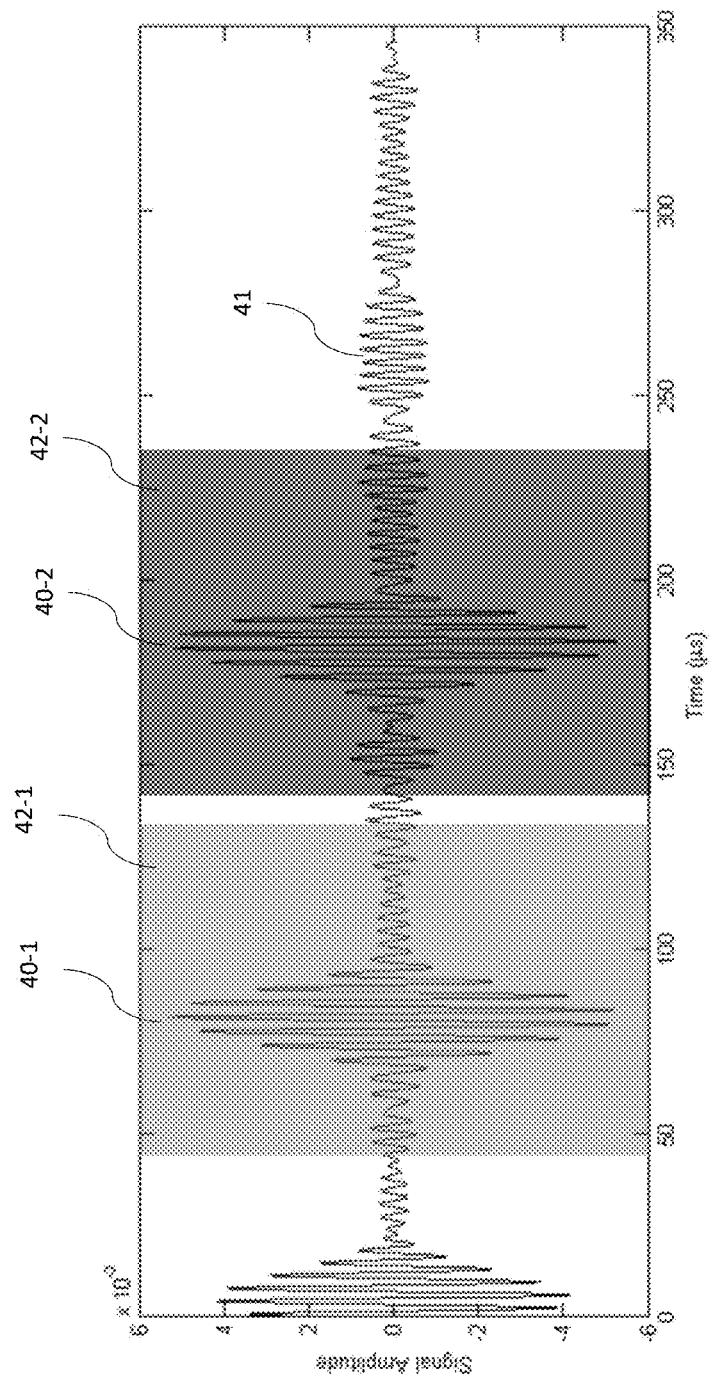
FIG. 4 illustrates one example of a signal containing the two signal components collected from a dual remotely-bonded FBG sensor due to an incident SH wave.

As illustrated in FIG. 4, the offset of the FBG 33 from the midpoint in the fiber loop 34 between the two bonded sections 31-1 and 31-2 is configured to allow for the two signal components 40-1 and 40-2 in time gates 42-1 and 42-2, respectively, to be sufficiently non-overlapping since the detection will occur on a single signal channel and be manifested as a single time-domain waveform 41. In some embodiments, for said signal components to be sufficiently non-overlapping, they should overlap by less than 50%. However, one of ordinary skill in the art will understand that more or less overlap may be sufficiently non-overlapping in some embodiments. Furthermore, because the difference between the two fiber path lengths 32-1 and 32-2 is known, as is the elastic guided wave speed in the fiber, the two signal components 40-1 and 40-2 can be delayed and recombined in post-processing in order to reconstruct the initial wave amplitude. In this manner, the sensor 30 is equally sensitive to guided waves 34 incident from any direction 35, and the original wave 34 can be reconstructed using a delay and sum method. In some embodiments, a delay and sum method includes calculating the delay time by dividing the difference between the two fiber path lengths 32-1 and 32-2 by the elastic guided wave speed in the fiber. The signal component 40-2 in time gate 42-2 (shown in FIG. 4) is then shifted in time by the delay time, such that the new time is the originally recorded time minus the delay time. The two signal components 40-1 and 40-2 are summed to produce the reconstructed wave while accounting for the phase difference that may occur depending on the incident angle of the wave.

Figure 5A:
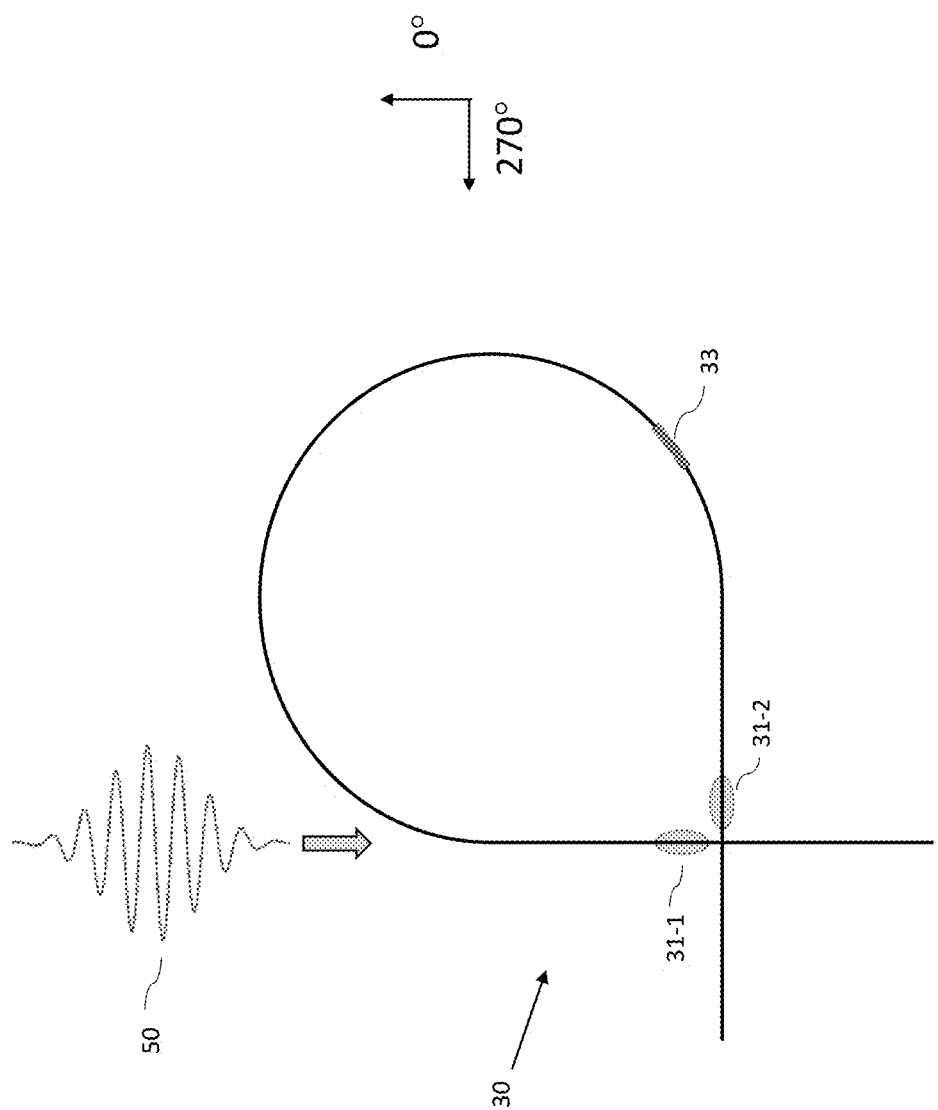
FIG. 5A illustrates one case in which an SH wave is incident on a dual remotely-bonded FBG sensor from 0°.

One additional advantage to this sensor configuration is that it can also provide information on the wave propagation direction 35, which is not possible with conventional single-element ultrasound sensors of any variety (FBG, piezoelectric, magnetostrictive, EMAT, etc.). The directional information can be extracted from the relative amplitude and phase of the two received waveforms 40-1 and 40-2. For example, consider FIG. 5A, in which an SH wave 50 incident to the sensor 30 from 0° would yield a maximum signal in time gate 42-1 (again shown in FIG. 4), which corresponds with bonded section 31-2, and a minimum signal in time gate 42-2, which corresponds with bonded section 31-1.

Figure 5B:
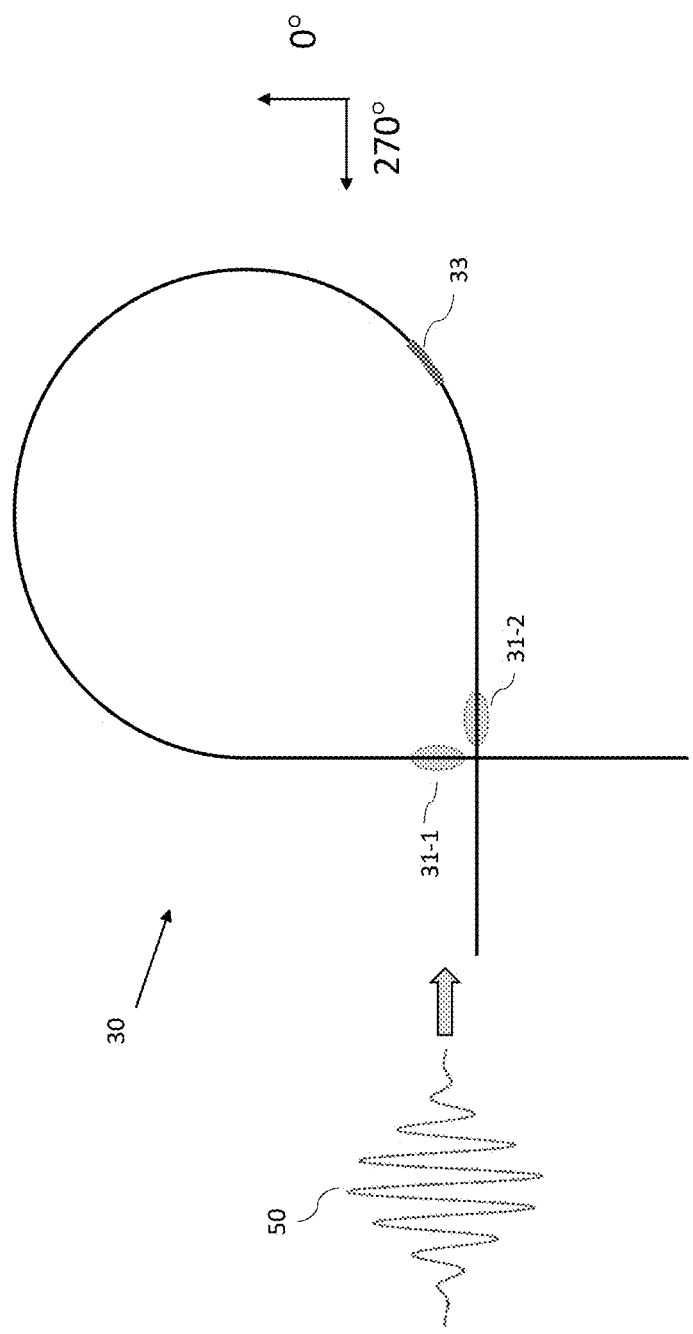
FIG. 5B illustrates one case in which an SH wave is incident on a dual remotely-bonded FBG sensor from 270°.

Alternatively, as illustrated in FIG. 5B, an SH wave 50 incident to the sensor 30 from 270° would yield the opposite result, in which the signal in time gate 42-1 would be minimized and the signal in gate 42-2 would be maximized. This amplitude ratio information can be used to determine a set of two possible lines of propagation (which are symmetric about the orthogonal axes) but cannot provide information on which of the two lines was the true propagation path or from which direction along the lines the wave propagated. However, the relative phase of the two signal components 40-1 and 40-2 (from time gates 42-1 and 42-2, respectively) can be extracted after the delay and shift, and this phase information can be used to determine along which of the two possible lines of propagation the wave 50 was actually traveling when detected by the sensor 30.

Figure 6A:
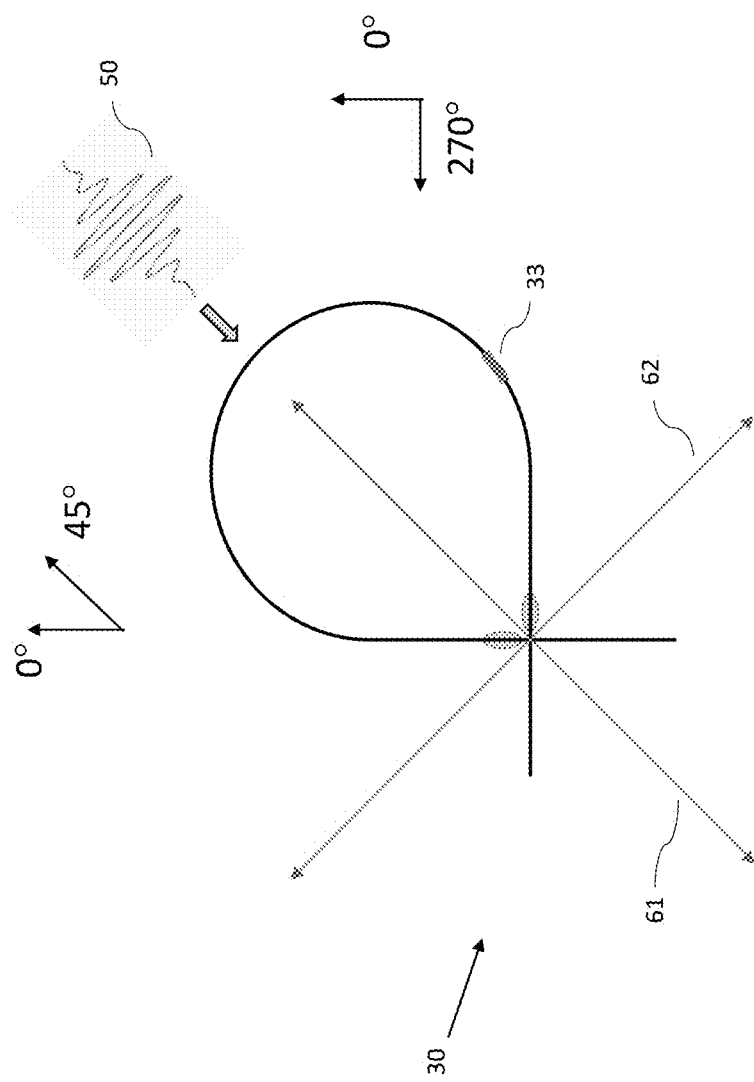
FIG. 6A illustrates one case in which an SH wave is incident on a dual remotely-bonded FBG sensor from 45°, with the two possible axes of wave propagation determined from the relative amplitude of the two signal components.

For example, consider the case in FIG. 6A, in which the SH wave 50 approaches the sensor 30 from 45°. The two received signal components 40-1 and 40-2 (in time gates 42-1 and 42-2, respectively) would be of approximately equal amplitude, which would allow the system to determine that the wave 50 was propagating along either the +45° to +225° line 61 or along the −45° to −225° line 62.

Figure 6B:
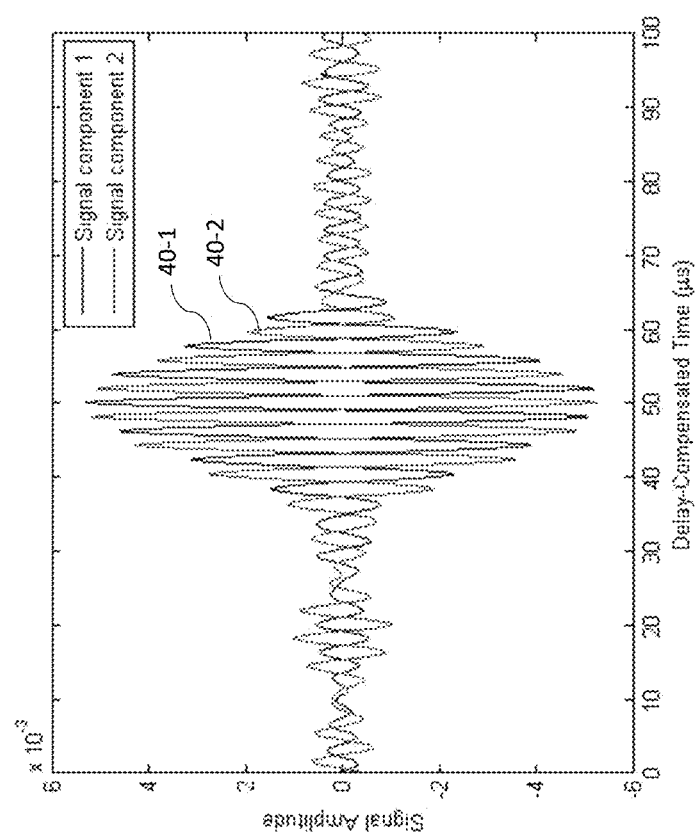
FIG. 6B illustrates a delayed overlay of the two signal components collected from a dual remotely-bonded FBG sensor due to an SH wave incident from 45°, which shows that the two components are out-of-phase from one another, which allows the true axis of propagation to be determined.

As illustrated in FIG. 6B, delaying the two signal components 40-1 and 40-2 and comparing the phase would indicate that they were out-of-phase by approximately 180°, which would indicate (assuming the wave 50 is of the SH type) that the wave could not have approached from the second or fourth quadrants, which would have yielded in-phase signal components. Therefore, the wave can be assumed to have propagated along the +45° to +225° line 61, which is correct. If the wave were assumed to be of the Lamb type, with in-plane displacement parallel to the wave vector, the phase relationship would be the opposite of that of the SH-waves described here.

The direction of propagation along line 61 cannot be determined with a single sensor in this configuration, nor can the wave type (SH or S), unless this is known a priori, but a second sensor configured at some distance from sensor 30 can provide sufficient information to determine both the wave type and the position of the guided wave source, as long as that source is not along a line bisecting the two sensors.

Figure 7:
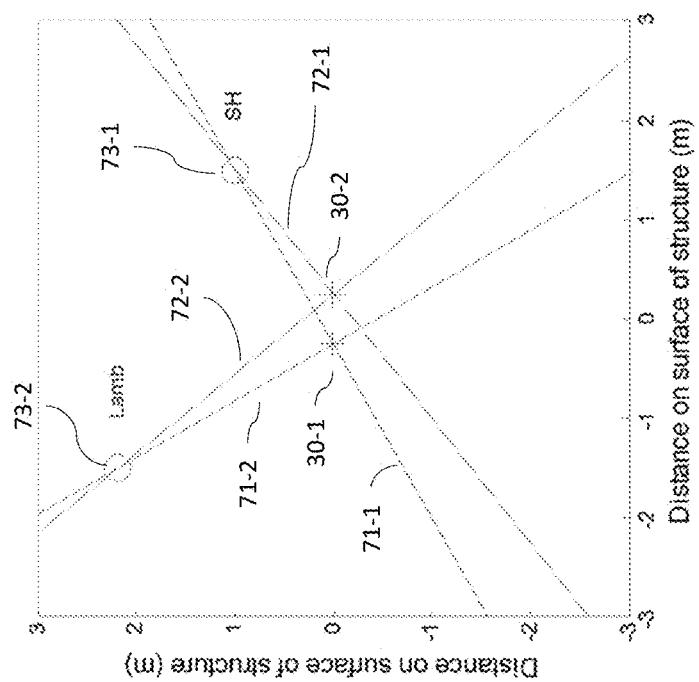
FIG. 7 illustrates the two possible guided wave source locations (one for Lamb waves and one for SH waves) determined from a pair of dual remotely-bonded FBGs using the disclosed algorithm.

FIG. 7 illustrates one example of a method for extracting the source localization information. The source location of an incident wave 34 (of either Lamb or SH type) upon a first sensor 30-1 and a second sensor 30-2 can be determined using the relative amplitude and phase of the two signal components 40-2 and 40-1 (from the two bonded sections 31-1 and 31-2, respectively) for each sensor 30-1 and 30-2 in conjunction with the time delay between the wave arrival at the two sensors. The relative amplitude and phase allows for the calculation of the bidirectional incident angle 61 (a line passing through the sensor and the source) for each sensor, as discussed above. However, if the wave mode type (SH or Lamb) is unknown a priori, then two orthogonal potential wave paths 71-1 and 71-2 exist for sensor 30-1. Additionally, two orthogonal potential paths 72-1 and 72-2 exist for sensor 30-2. In this example shown in FIG. 7, paths 71-1 and 72-1 correspond to SH wave propagation, and paths 71-2 and 72-2 correspond to Lamb wave propagation. Since the wave is either of the SH or the Lamb type, there exist two possible intersection points, 73-1 and 73-2. Point 73-1 is the intersection point of lines 71-1 and 72-1 and is the signal source location if the wave is of the SH type. Alternatively, point 73-2 is the intersection point of lines 71-2 and 72-2 and is the signal source location if the wave is of the Lamb type.

Generally, these two modes travel at different velocities, so the difference in arrival time at the two sensor locations (which are known) will determine which mode type was propagated, and thus which of the two locations, the source wave originated. Note that the wave velocity in the structure 13 is the group velocity of the guided wave mode, which for plates is dependent on the thickness, frequency, and material properties, and can generally be predicted with relatively high accuracy. Therefore, the difference in arrival time of the wave at the two sensor locations can be used to determine whether the mode was Lamb-type or SH-type and thus which location is the true origin location of the wave.

It should be noted that the ability to determine any source location information with one or two sensor channels instead of three or more is a significant advantage for many applications. Reducing the number of sensors required for source location and reducing the number of signal channels required can reduce system weight, cost, and complexity in a variety of applications. In conventional source location algorithms, it is necessary to have N+1 sensors for N-dimensional source location calculations. For example, ultrasonic guided waves generated in a plate-like structure (effectively 2-D) will be accurately located using three sensors with conventional location algorithms. Note also that the source must be within the triangle outlined by the three sensors to obtain an accurate solution for conventional source location algorithms for applications such as acoustic emission, because only relative arrival times between sensors are known due to an unknown wave origination time (acoustic zero). In contrast, source location using the novel configuration of optical sensors described herein can be achieved with one less sensor than in conventional applications, and also be achieved with high accuracy in an area that includes sources outside of the area between sensors. This is due to the information on the angle of incidence of the ultrasonic guided wave 50 on the optical sensor 30, which conventional sensor signals do not contain. For example, two optical sensors having the novel design described herein can achieve localization in 2-D instead of needing three sensors, and this source localization can be achieved for the area outside of the sensor array. Additionally, the optical sensors have the added advantage of being able to use the same (fiber optic) cable, as opposed to separate cables for each of the sensors in the conventional system.

As an example, consider a traveling elastic guided wave at a relatively low frequency, e.g., a frequency at which the traveling elastic guided wave has a wavelength that is approximately equal to or greater than the plate thickness, where the problem is simplified because there are only a few modes that exist in the plate. The $S_0$ and $A_0$ Lamb-type modes exist, but based on the displacement wave structures, only the $S_0$ mode will effectively excite the $L(0,1)$ mode in the fiber, causing a received signal of sufficiently high amplitude. This is not to say that the sensor described herein is incapable of detecting antisymmetric (A) type guided waves in general. There is only a single SH-type mode that exists, the $SH_0$ mode, which has a constant group velocity equal to the shear wave speed in the plate. The $S_0$ mode has a relatively constant group velocity at these low frequencies, but the velocity is significantly higher than for the $SH_0$ mode, allowing the mode type to be easily distinguished.

Again, consider FIG. 7, which shows the two potential source locations for an incident wave onto two double remote bonded optical sensors 30-1 and 30-2. In this case, the two bonded sections within each optical sensor are oriented at 0° and 90°, represented by the + sign marking the two optical sensor locations. The relative amplitude and phase of the wave packets arriving at each sensor will be similar for a wave originating either from the potential source location 73-1 (SH) or the potential source location 73-2 (Lamb). However, the mode type can be determined by the relative arrival time between the two sensors. The absolute wave arrival times can be calculated based on the relative path lengths to the two optical sensor locations. For example, in some embodiments, the wave propagation time in the structure-under-test is equal to the distance travelled divided by the wave velocity. The relative arrival time is the amount of time that has passed between the arrival of the wave at the first sensor and the arrival of the wave at the second sensor. In the example illustrated in FIG. 7, the SH-type mode will arrive at the rightmost sensor 30-2 first and have a relative arrival time between the two sensors of 134 µs. In contrast, the Lamb-type $S_0$ mode will arrive at the leftmost sensor 30-1 first and have a relative arrival time between the two sensors of 53 µs.

Figure 8:
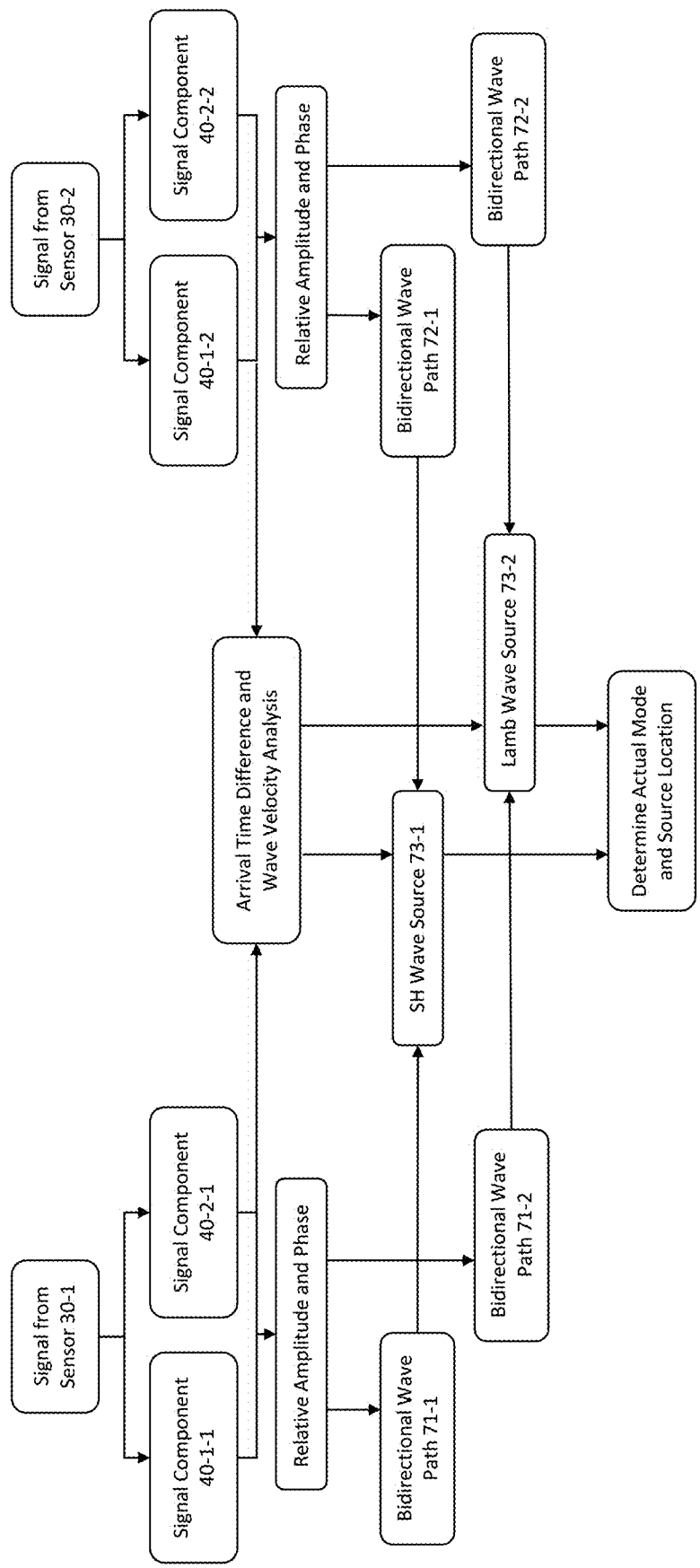
FIG. 8 illustrates the algorithm by which signals from a pair of dual remotely-bonded FBGs can be used to determine the guided wave mode type and the location of the source of that wave.
Figure 9A:
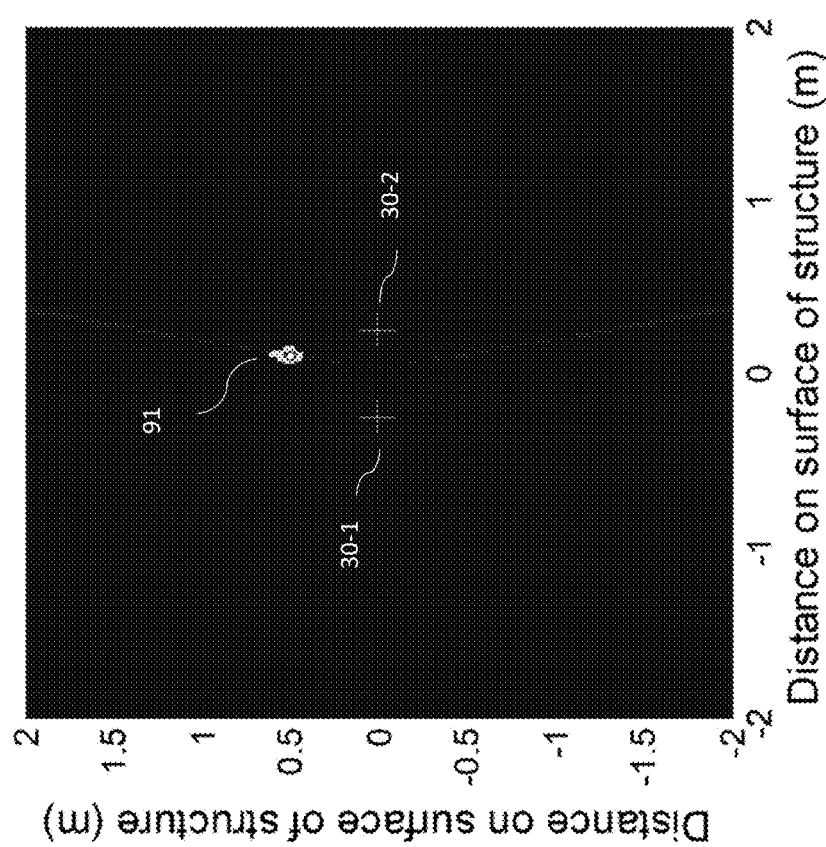
FIG. 9A illustrates a guided wave source location result (with potential error region) determined by applying the disclosed algorithm in conjunction with a pair of dual remotely-bonded FBGs for a first source location.
Figure 9B:
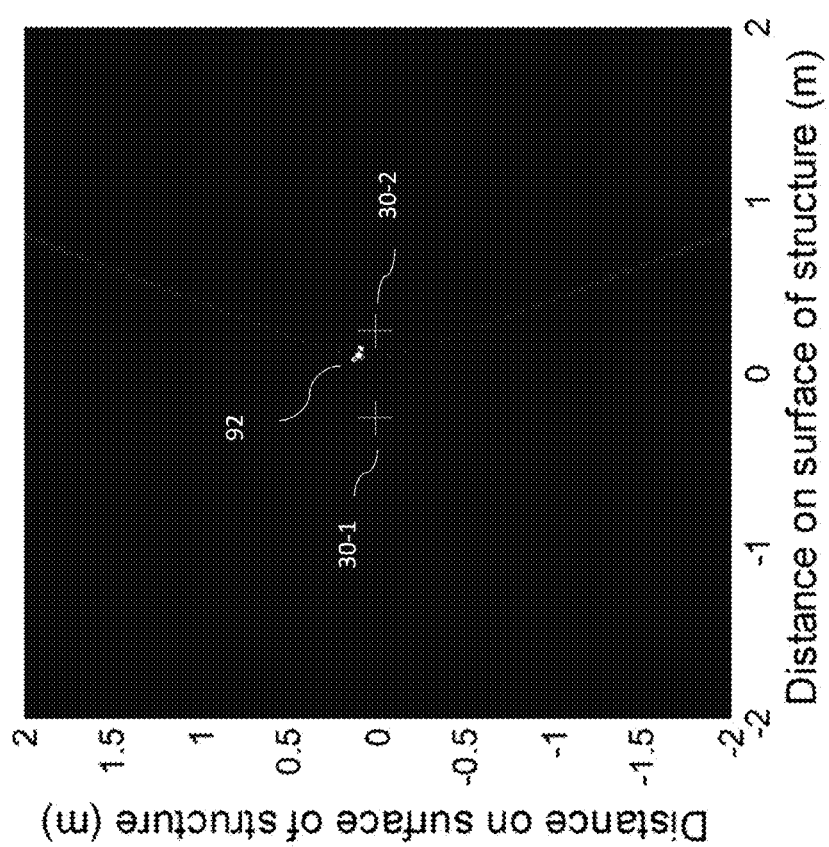
FIG. 9B illustrates a guided wave source location result (with potential error region) determined by applying the disclosed algorithm in conjunction with a pair of dual remotely-bonded FBGs for a second source location.
Figure 9C:
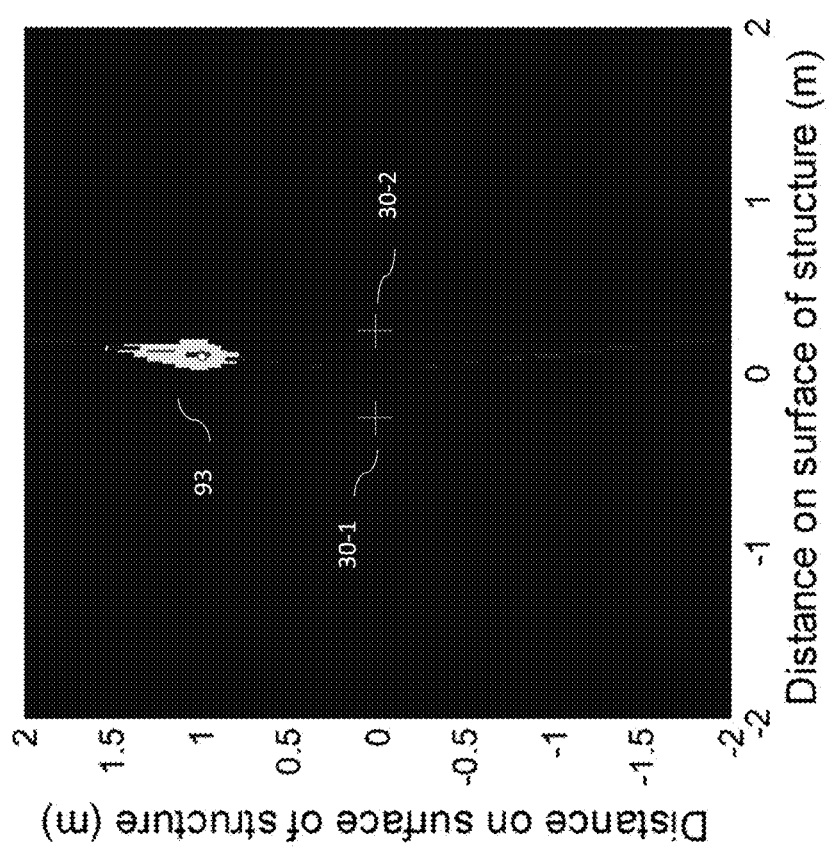
FIG. 9C illustrates a guided wave source location result (with potential error region) determined by applying the disclosed algorithm in conjunction with a pair of dual remotely-bonded FBGs for a third source location.
Figure 9D:
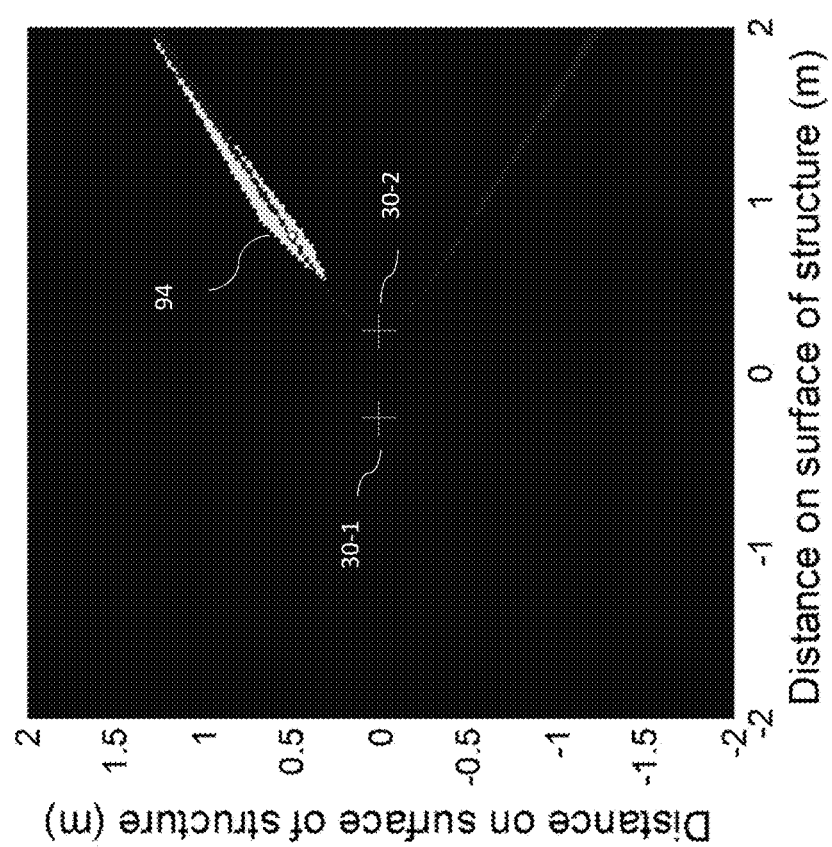
FIG. 9D illustrates a guided wave source location result (with potential error region) determined by applying the disclosed algorithm in conjunction with a pair of dual remotely-bonded FBGs for a fourth source location.

FIG. 8 illustrates one example of a process by which both mode and source location is determined using two of the disclosed sensors in 2-D (on a plate or plate-like structure). The signals from two sensors, 30-1 and 30-2, are processed into signal components 40-1-1 and 40-2-1, and 40-1-2 and 40-2-2, respectively. These components are analyzed to determine their relative amplitude and phase, and the bidirectional wave paths are calculated. The components are also analyzed to determine the arrival time difference at the two sensor locations. Based on the a priori knowledge of wave velocity and sensor locations, analysis is performed using this information and also the bi-directional wave paths to determine two source locations, one for SH type and one for Lamb type guided waves. The actual mode and source location is then calculated. In practice, there will be a small, but known, amount of error in the localization capabilities of the sensors. This is also present in conventional source location algorithms employed in acoustic emission, where an emission source will commonly be located to a small region, as opposed to an exact point. The localization error can be described based on the error in the arrival time calculation and the error in the incident angle calculation. The true source location can be determined to a small area with a high degree of confidence, similar to the conventional location algorithm case.

Due to the potential error in source location, the source location capability performs best in a rectangular area centered between the two optical sensors, approximately twice as long as the sensor spacing. However, unlike conventional source location algorithms, the location algorithm with these optical sensors can also work well outside of this area—either above or below the area between the sensors or on the far side of either sensor. Different regions allow for a higher or lower degree of confidence in source location position.

FIGS. 9A, 9B, 9C, and 9D illustrate this concept. The two locations of the two sensors 30-1 and 30-2 are marked with a + sign and are separated by a distance of 0.5 m. The calculated source location given by angular information alone is confined to light-colored areas 91, 92, 93, and 94, respectively (assuming an angular accuracy of ±5°). The calculated source location given by the arrival time difference between the two sensors is shown by the smaller, darker-colored area within each light-colored area (assuming an arrival time accuracy of 1 µs). The true source location is indicated by the white dot that lies within the darker area for each case. For source locations between the sensors and within the region of highest accuracy (FIG. 9A and FIG. 9B), the potential error in source location is relatively small. For source locations further from the center point between the sensors (FIG. 9C) and outside of the region between the sensors (FIG. 9D), the location algorithm still works well, even accounting for some level of error that will occur in normal use.

It should be noted that source location for applications such as acoustic emission is only one possible use of the sensors described herein. The same sensors can also be deployed for other active and passive ultrasonic guided wave applications.

In a first sensor embodiment, such as the embodiment illustrated in FIG. 3, two remotely bonded sections 31-1 and 31-2 of fiber optic cable 10 are oriented orthogonally to and in close proximity to one another with an FBG 33 configured on the loop of fiber 34 between said bonded sections, with said FBG being offset from the midpoint of the loop and configured with sufficient non-equal fiber lengths 32-1 and 32-2, such that the detected guided wave signal components 40-1 and 40-2, similar to those shown in FIG. 4, are sufficiently non-overlapping. The two remotely-bonded sections 31-1 and 31-2 need not be oriented precisely orthogonal to one another. The appropriate lengths of fiber 32-1 and 32-2 between the two remotely-bonded sections and the grating 33, as well as the difference in these two lengths, will be dependent on the application and the length of signal in the time domain that is required to be non-overlapping. In some embodiments, the length of the remotely bonded sections 31-1 and 31-2 is generally less than one wavelength of the guided wave they are intended to detect, but the appropriate bond length will also depend on the application. The methods of bonding the fiber sections to the structure 13 include adhesives, epoxies, tapes, and other methods. The type of grating 33 and fiber optic cable 10 can also take on various forms depending on the application.

In some embodiments, the two bonded fiber sections 31-1 and 31-2 correspond to two separate FBGs, either on the same fiber or on separate fibers. The signals from the two separate remotely-bonded orthogonal sections may be acquired on a single signal channel or on two separate signal channels. When a system with multiple FBGs is used, the system may be configured such that the user can differentiate which signal originated from which sensor location. There are various ways to accomplish this that are conventionally used in fiber optic Bragg grating applications, all of which would be understood by those of ordinary skill in the art.

The novel sensor design described herein can be implemented by utilizing a conventional FBG 33 on a fiber 10, creating a loop 34 in said fiber, and bonding the two remote sections 31-1 and 31-2 according to the description.

Figure 10:
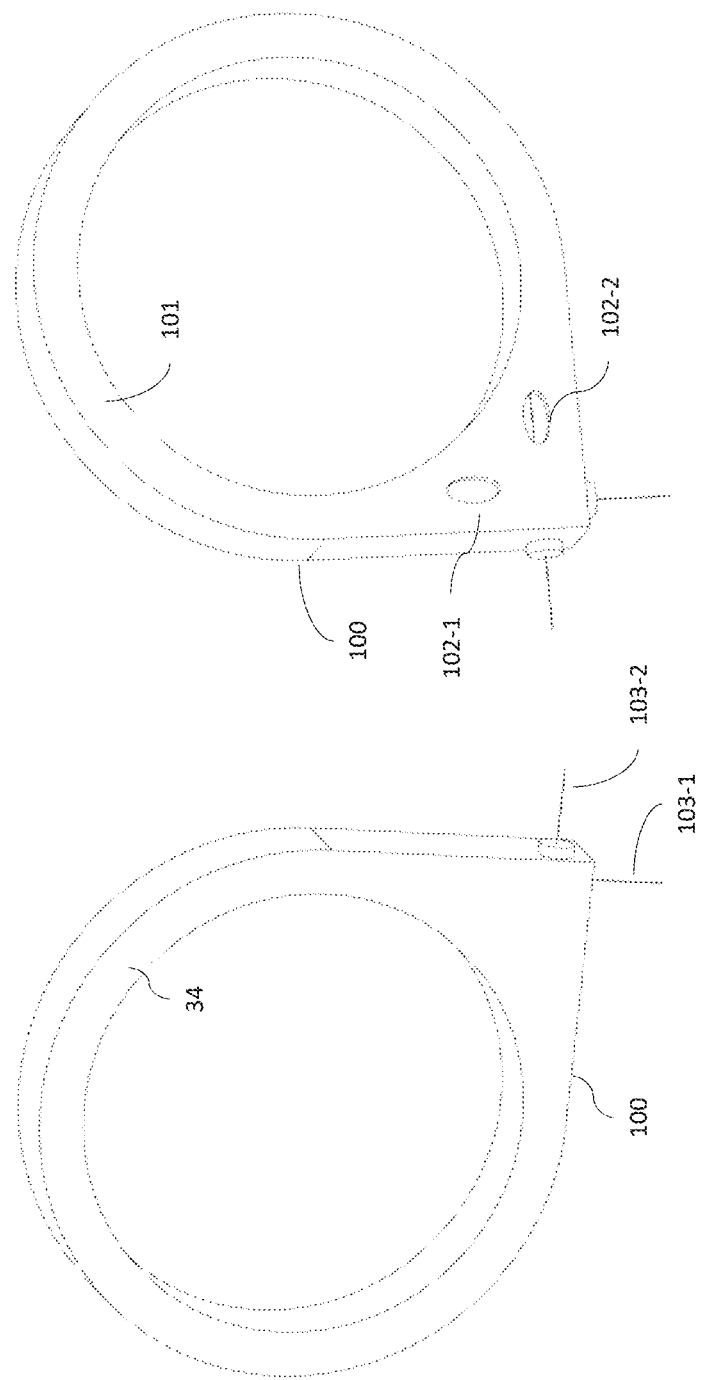
FIG. 10 illustrates two views of one embodiment of a dual remotely-bonded FBG sensor configured within a housing.

In some embodiments, such as the embodiment illustrated in FIG. 10, the FBG sensor is pre-configured in a specially-designed housing 100. Here, the loop of fiber 34 containing the grating 33 and the fiber lengths 32-1 and 32-2 between said grating and the two bonded sections 31-1 and 31-2, as shown in FIG. 3, is located within an internal channel 101 within the housing 100. The sections of fiber predetermined for remote bonding are oriented such that they are approximately orthogonal to one another and are either exposed through one or more small windows 102-1 and 102-2 in housing 100 or are prepared with adhesive or transfer tape. The two ends of the fiber 103-1 and 103-2 may exit the housing at 90° to one another or at a lesser angle.

In additional embodiments, instead of the fiber loop being wrapped through a channel 101, the fiber is simply looped freely and contained within a larger housing. In another embodiment, the fiber loop 34 is not contained within the housing. The housing may be rigid or flexible, including a laminate construction. The housing may be constructed of metals, polymers, or other compounds. The housing is beneficial because it makes installation easier and protects the fiber loop section from damage, damping, or environmental effects that could impact its ability to efficiently transmit the elastic guided waves from the bonded sections to the grating. Furthermore, the looped fiber section 34 may be coated with material selected to reduce cross-talk between sections of said fiber that are in contact with one another. Furthermore, the sections of fiber 103-1 and 103-2 immediately outside the sensor housing 100 may be coated with a material selected to damp the propagation of elastic guided waves within said fiber in order to prevent cross-talk between additional sensors on the fiber 10.

Figure 11:
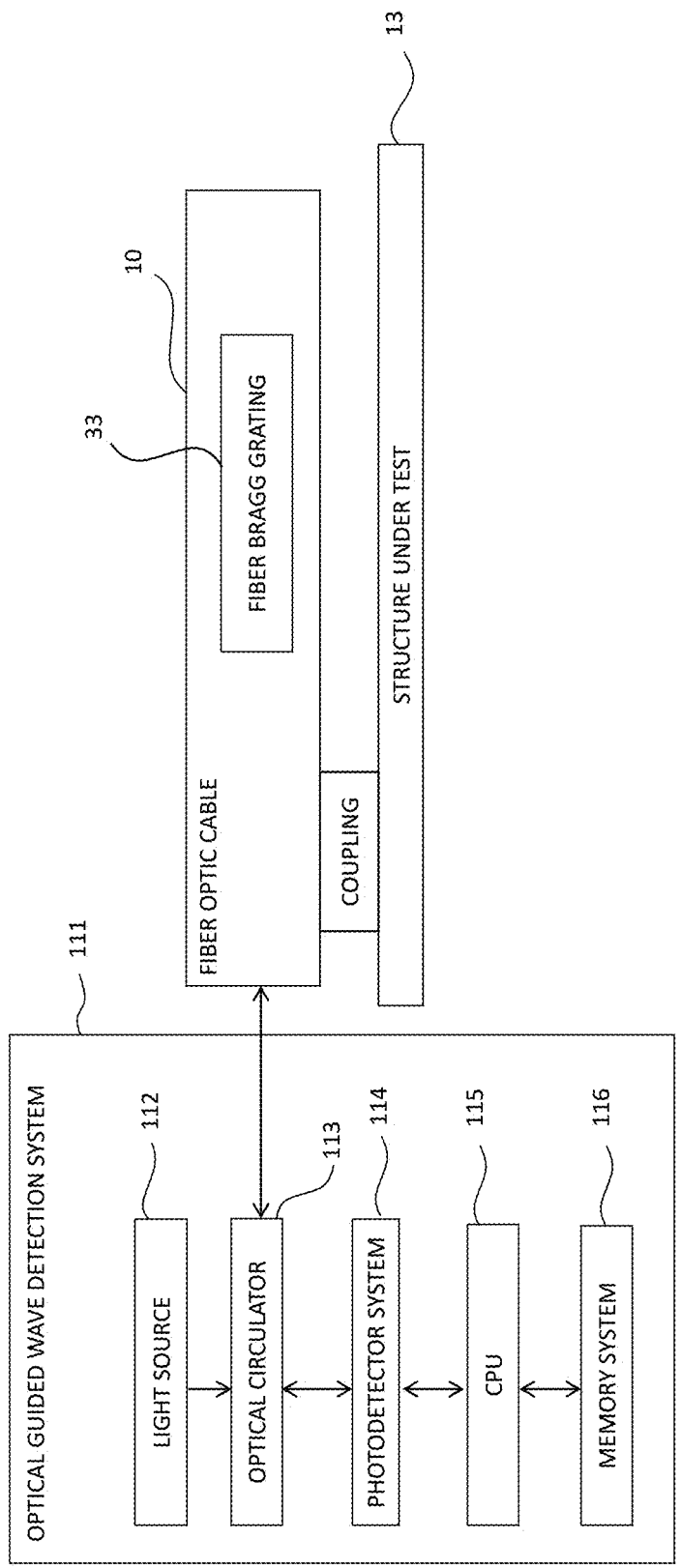
FIG. 11 is a diagram of one embodiment of the optical guided wave detection system with a remotely-bonded FBG sensor.

FIG. 11 is a diagram of one embodiment of the optical guided wave detection system 111 in accordance with some embodiments. A light source 112 is introduced to a fiber optic cable 10 through an optical circulator 113. A fiber Bragg grating (FBG) 33 is contained within the fiber optic cable 10 and the fiber optic cable 10 is coupled to the structure under test 13. Reflected light from the FBG is introduced to the photodetector system 114 through the optical circulator 113, and is processed and recorded by the CPU (central processing unit) 115, which may include one or more processors, and a memory system 116, which may include a random access memory ("RAM"), read only memory ("ROM"), Flash memory, and combinations thereof. In some embodiments, the photodetector system 114 includes a feedback loop to the light source 112 in order to keep the laser wavelength locked onto the slope of the reflected light from the FBG. In some embodiments, the photodetector system 114 includes a matched grating, which is used to demodulate the ultrasonic signal. In some embodiments, the photodetector system 114 detects the light spectra over a range of wavelengths encompassing the FBG sensor (s).

The signal processing methods described above for the embodiment of a FBG sensor disposed along a fiber between two coupled sections can also be applied to the embodiment of two FBG sensors disposed along one or more fibers, where there is one FBG sensor for each coupled section.

Figure 12A:
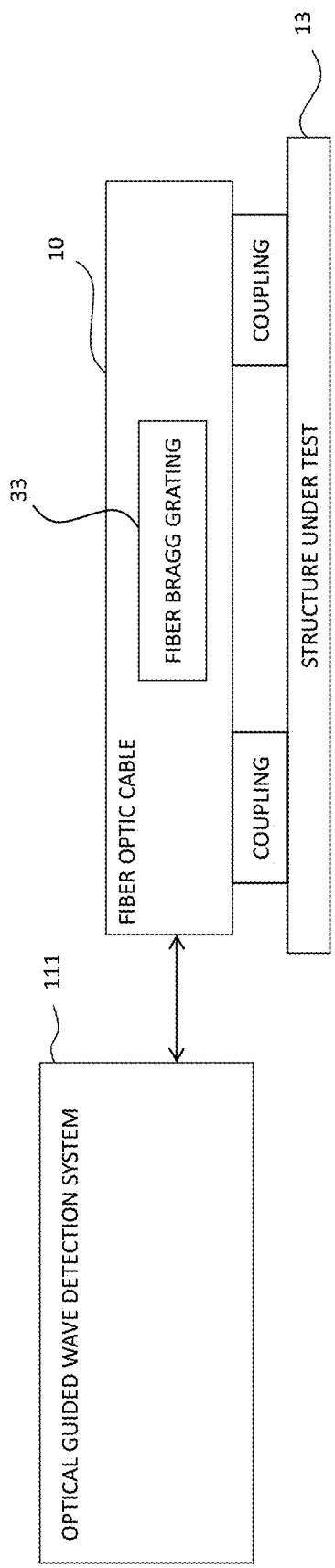
FIG. 12A is a diagram of one embodiment of the optical guided wave detection system with a dual remotely-bonded FBG sensor.
Figure 12B:
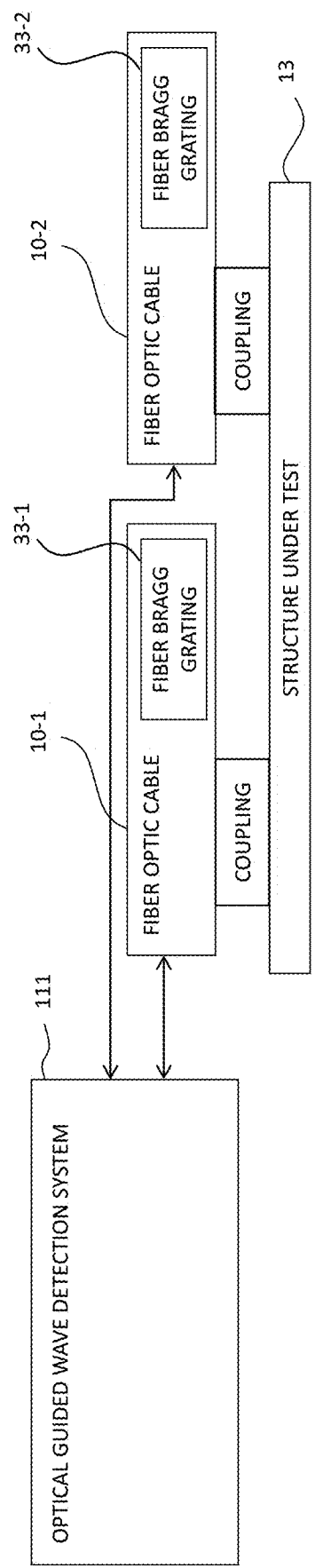
FIG. 12B is a diagram of one embodiment of the optical guided wave detection system with two remotely-bonded FBG sensors on two separate optical fibers.
Figure 12C:
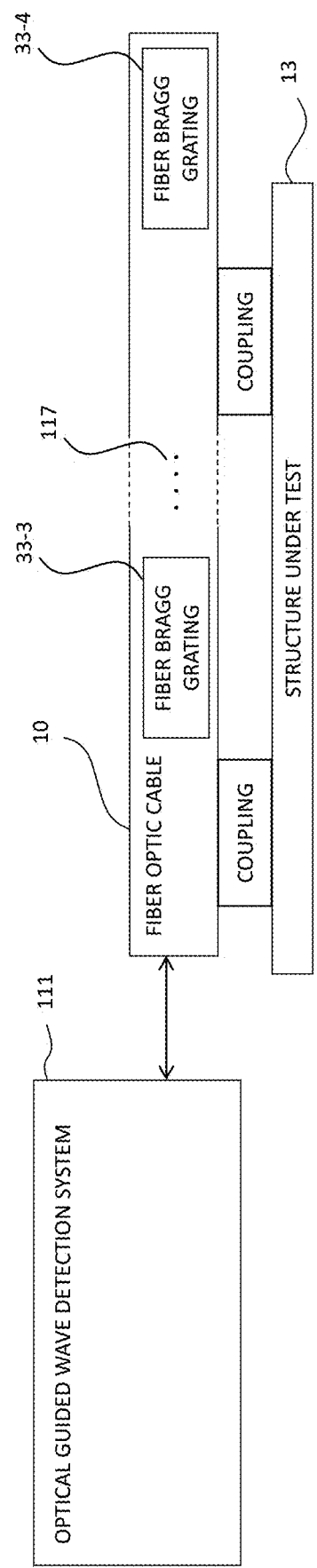
FIG. 12C is a diagram of one embodiment of the optical guided wave detection system with two remotely-bonded FBG sensors along a single optical fiber.

FIGS. 12A, 12B, and 12C are diagrams which show several embodiments of the coupling of the fiber to the structure-under-test. In the embodiment shown in FIG. 12A, the optical guided wave detection system 111 is connected to a single fiber optic cable 10, which is coupled at two locations to the structure under test 13, and includes a FBG 33 that is positioned between the two coupled sections. In the embodiment shown in FIG. 12B, the optical guided wave detection system is connected to two fiber optic cables 10-1 and 10-2, which are each coupled to the structure under test 13, and each contain a FBG 33-1 or 33-2 that is not collocated with a coupled section. In the embodiment shown in FIG. 12C, the optical guided wave detection system is connected to a single fiber optic cable 10, which is coupled at two locations to the structure under test 13, and contains two FBGs 33-3 and 33-4 which are adjacent to the two coupled sections. In this embodiment, the two coupled sections and their corresponding FBGs are adjacent to a separation 117 along the fiber by at least one of a long length of fiber, a damping material, and a fiber coating which has the effect of isolating the guided stress waves traveling in the fiber on either side of the separation 117.

Although the systems and methods have been described in terms of exemplary embodiments, they are not limited thereto. Rather, the appended claims should be construed broadly, to include other variants and embodiments of the disclosed systems and methods, which may be made by those of ordinary skill in the art without departing from the scope and range of equivalents of the systems and methods.

What is claimed is:

1. A system, comprising:
   at least one optical fiber including at least one fiber Bragg grating (FBG) disposed along a length thereof, the at least one optical fiber configured to be coupled to a structure in at least one location, the location at which the optical fiber is configured to be coupled to the structure being different from a location at which the FBG is disposed; and
   an optical guided wave detection system coupled to the at least one optical fiber, the optical guided wave detection system including:
      a light source optically coupled to the at least one optical fiber, the light source configured to inject light into the at least one optical fiber;
      a photodetector configured to detect a shift in a wavelength spectrum of light reflected by the at least one FBG as a result of a time-varying strain induced at the at least one FBG; and
      a processor in signal communication with the photodetector, the processor configured to detect a shear-horizontal guided stress wave propagating in said structure based on the shift in the wavelength spectrum detected by the photodetector induced by a longitudinal-type guided stress wave that is propagated along the at least one optical fiber.

2. The system of claim 1, wherein the optical guided wave detection system is configured to detect the shear horizontal guided stress wave propagating in said structure using a longitudinal-type guided stress wave that is propagated along the at least one optical fiber.

3. The system of claim 2, wherein the longitudinal-type guided stress wave is generated by the coupling of a SH-wave-induced surface vibration at the at least one location that is coupled to the structure.

4. The system of claim 2, wherein the at least one optical fiber is configured to be coupled to the structure in at least two different locations.

5. The system of claim 1, wherein the at least one FBG is at least one of a single-wavelength, π-shifted, or variable wavelength grating.

6. The system of claim 1, wherein the at least one FBG includes a pair of FBGs configured to operate as a Fabry-Perot interferometer.

7. A system, comprising:
   at least one optical fiber including at least one first fiber Bragg grating (FBG) disposed along a length thereof, the at least one optical fiber configured to be coupled to a structure in at least two different locations such that the at least one first FBG is disposed between the at least two different locations; and
   an optical guided wave detection system coupled to the at least one optical fiber, the optical guided wave detection system including:

a light source optically coupled to said at least one optical fiber, the light source configured to inject light into the at least one optical fiber;

a photodetector configured to detect a shift in a wavelength spectrum of light reflected by said at least one first FBG as a result of a time-varying strain induced at the at least one first FBG; and a processor in signal communication with the photodetector, the processor configured to detect a guided stress wave in the structure based on the shift in the wavelength spectrum detected by the photodetector, wherein the guided stress wave is a shear horizontal guided stress wave, and wherein the processor is configured to detect a source of the shear horizontal guided stress wave based, at least in part, on a longitudinal-type guided stress wave that is propagated along the at least one optical fiber.

8. The system of claim 7, wherein:

the longitudinal-type guided stress wave is generated by the coupling of a SH-wave-induced surface vibration at a first section of the at least one optical fiber that is at one of the at least two different locations at which the at least one optical fiber is coupled to the structure;

the longitudinal-type guided stress wave is proportional to a component of the SH-wave-induced surface vibration that is parallel to the fiber at the at least one of the at least two different locations at which the at least one optical fiber is coupled to the structure; and the longitudinal-type guided stress wave induces a time-varying strain in the first FBG.

9. The system of claim 7, wherein the at least one first FBG is at least one of a single-wavelength, π-shifted, or variable wavelength grating.

10. The system of claim 7, wherein the at least one first FBG includes a pair of FBGs configured to operate as a Fabry-Perot interferometer.

11. The system of claim 7, wherein the optical guided wave detection system is configured to detect non-SH-type guided stress waves including Lamb-type waves propagating in the structure and impinging on a first section of the at least one optical fiber that is coupled to the structure at a first location of the at least two different locations and a second section of the at least one optical fiber that is coupled to the structure at a second location of the at least two different locations.

12. The system of claim 11, wherein:

the longitudinal-type guided stress wave is generated by the coupling of a non-SH-wave-induced surface vibration at a first section of the at least one optical fiber that is at one of the at least two different locations at which the at least one optical fiber is coupled to the structure;

the longitudinal-type guided stress wave is proportional to a component of the non-SH-wave-induced surface vibration that is parallel to the fiber at the at least one of the at least two different locations at which the at least one optical fiber is coupled to the structure; and the longitudinal-type guided stress wave induces a time-varying strain in the first FBG.

13. The system of claim 7, further comprising a housing defining an opening in which at least a portion of the at least one optical fiber is disposed.

14. The system of claim 13, wherein said housing further covers, at least partially, a loop formed by the at least one optical fiber between the at least two different locations at which the at least one optical fiber is configured to be coupled to the structure.

15. The system of claim 7, wherein the at least two different locations are separated by a distance on the structure that is less than a wavelength of the guided stress wave in the structure.

16. The system of claim 7, wherein an axis of the at least one first optical fiber at a first location of the at least two different locations is non-parallel with an axis of the at least one first optical fiber at a second location of the at least two different locations.

17. The system of claim 16, wherein the axis of the at least one fiber optical fiber at the first location of the at least two different locations is orthogonal to the axis of the at least one first optical fiber at the second location of the at least two different locations, and wherein a first distance along the at least one first optical fiber between a first one of the at least two different locations and the at least one FBG is not equal to a second distance along the at least one first optical fiber between a second one of the at least two different locations and the at least one FBG.

18. The system of claim 7, wherein the at least one first FBG includes a first FBG and a second FBG, the first FBG is disposed between the at least two different locations, and the second FBG is disposed adjacent to at least one of the at least two different locations at which the at least one optical fiber is coupled to the structure.

19. A method, comprising:

introducing light into at least one optical fiber, the at least one optical fiber being coupled to a surface of a structure in at least two different locations;

extracting at least one time-varying signal by detecting a shift in a wavelength spectrum of light reflected by at least one fiber Bragg grating (FBG) sensor as a result of a time-varying strain on the at least one FBG sensor, the at least one FBG sensor disposed along a length of the at least one optical fiber between the at least two different locations where the at least one optical fiber is coupled to the surface of the structure;

detecting a guided stress wave propagating in the structure based on the shift in the wavelength spectrum; and determining a location of the guided stress wave, wherein determining the location of the source of the guided stress wave includes:

extracting at least two signal components from said time-varying signal, determining a relative amplitude and phase of the at least two signal components extracted from the time-varying signal, and processing said signal components based on an orthogonality of a respective axis of the at least one optical fiber at each of the at least two different locations to determine at least one of a bidirectional wave path of an SH-type guided stress wave and a bidirectional wave path of a non-SH-type guided stress wave propagating in said structure.

20. The method of claim 19, wherein the at least one FBG sensor includes a plurality of FBG sensors disposed along the length of the at least one optical fiber, the method further comprising:

identifying at least one intersection point of a plurality of bidirectional wave paths of an SH-type guided stress wave associated with and passing through each of the plurality of FBG sensors;

identifying at least one intersection point of a plurality of bidirectional wave paths of a non-SH-type guided stress wave associated with and passing through each of the plurality of FBG sensors;

calculating a difference in arrival times of at least one of the SH-type guided stress waves and the non-SH-type guided stress waves associated with and passing through at least one pair of the plurality of FBG sensors;

predicting at least one expected arrival time difference between said at least one pair of the plurality of FBG sensors based on estimated wave velocities for at least one of an SH-type and a non-SH-type guided stress wave in the structure; and identifying at least one pair of FBG sensors of the plurality of FBG sensors that provide a best approximation of the location of the source of the guided stress wave propagating in the structure by comparing a calculated arrival time difference and a predicted arrival time difference between the at least one pair of the plurality of FBG sensors to determine which type of guided wave and which intersection point has a minimum arrival time difference between the calculated arrival time difference and the predicted arrival time difference.

21. A method, comprising:

introducing light into at least one optical fiber, the at least one optical fiber being coupled to a surface of a structure in at least two different locations;

extracting at least one time-varying signal by detecting a shift in a wavelength spectrum of light reflected by a plurality of fiber Bragg grating (FBG) sensors as a result of a time-varying strain on the plurality of FBG sensors, the plurality of FBG sensors disposed along a length of the at least one optical fiber between the at least two different locations where the at least one optical fiber is coupled to the surface of the structure; and detecting a guided stress wave propagating in the structure based on the shift in the wavelength spectrum;

identifying at least one intersection point of a plurality of bidirectional wave paths of an SH-type guided stress wave associated with and passing through each of the plurality of FBG sensors;

identifying at least one intersection point of a plurality of bidirectional wave paths of a non-SH-type guided stress wave associated with and passing through each of the plurality of FBG sensors;

calculating a difference in arrival times of at least one of the SH-type guided stress waves and the non-SH-type guided stress waves associated with and passing through at least one pair of the plurality of FBG sensors;

predicting at least one expected arrival time difference between said at least one pair of the plurality of FBG sensors based on estimated wave velocities for at least one of an SH-type and a non-SH-type guided stress wave in the structure; and identifying at least one pair of FBG sensors of the plurality of FBG sensors that provide a best approximation of the location of the source of the guided stress wave propagating in the structure by comparing a calculated arrival time difference and a predicted arrival time difference between the at least one pair of the plurality of FBG sensors to determine which type of guided wave and which intersection point has a minimum arrival time difference between the calculated arrival time difference and the predicted arrival time difference.

* * * * *